United States Patent
Chen et al.

(10) Patent No.: US 11,516,631 B2
(45) Date of Patent: Nov. 29, 2022

(54) ON-DEMAND NETWORK CONFIGURATION OF V2X UE AUTONOMY IN NEW RADIO MOBILE COMMUNICATIONS

(71) Applicant: MediaTek Inc., Hsinchu (TW)

(72) Inventors: Ju-Ya Chen, Hsinchu (TW); Ahmet Umut Ugurlu, Cambridge (GB)

(73) Assignee: MediaTek Inc.

( * ) Notice: Subject to any disclaimer, the term of this patent is extended or adjusted under 35 U.S.C. 154(b) by 193 days.

(21) Appl. No.: 16/586,870

(22) Filed: Sep. 27, 2019

(65) Prior Publication Data

US 2020/0107171 A1 Apr. 2, 2020

Related U.S. Application Data

(60) Provisional application No. 62/738,199, filed on Sep. 28, 2018.

(51) Int. Cl.
*H04W 4/40* (2018.01)
*H04W 28/02* (2009.01)
(Continued)

(52) U.S. Cl.
CPC ......... *H04W 4/40* (2018.02); *H04W 28/0268* (2013.01); *H04W 72/042* (2013.01);
(Continued)

(58) Field of Classification Search
None
See application file for complete search history.

(56) References Cited

U.S. PATENT DOCUMENTS 11,191,059 B2 * 11/2021 Kim .................. H04L 5/001
11,284,387 B2 * 3/2022 Lin .................... H04L 5/0007
(Continued)

FOREIGN PATENT DOCUMENTS

| WO | WO 2017134235 A1 | 8/2017 |
| WO | WO 2018004323 A1 | 1/2018 |
| WO | WO 2018149265 A1 | 8/2018 |

OTHER PUBLICATIONS

China National Intellectual Property Administration, International Search Report and Written Opinion for PCT/CN2019/108618, dated Dec. 27, 2019.
(Continued)

*Primary Examiner* — Ajit Patel
*Assistant Examiner* — Liem H. Nguyen
(74) *Attorney, Agent, or Firm* — Han IP PLLC; Andy M. Han

(57) ABSTRACT

Various examples and schemes pertaining to on-demand network configuration of vehicle-to-everything (V2X) user equipment (UE) autonomy in New Radio (NR) mobile communications are described. An apparatus implemented in a first user equipment (UE) receives a signaling from a network node of a wireless network. Based on the signaling, the apparatus operates simultaneously in a network-controlled mode and an autonomous mode such that: (a) the first UE operates in the network-controlled mode with respect to resource allocation on a first sidelink with a second UE, and (b) the first UE operates in the autonomous mode with respect to resource allocation on a second sidelink with the second UE or a third UE.

14 Claims, 5 Drawing Sheets

(51) Int. Cl.

| | | |
|---|---|---|
| *H04W 72/04* | (2009.01) | |
| *H04W 76/27* | (2018.01) | |
| *H04W 92/18* | (2009.01) | |
| *H04W 24/02* | (2009.01) | |
| *H04W 40/22* | (2009.01) | |
| *H04W 72/08* | (2009.01) | |
| *H04W 76/14* | (2018.01) | |
| *H04L 47/24* | (2022.01) | |
| *H04L 47/2441* | (2022.01) | |
| *H04L 47/2475* | (2022.01) | |
| *H04L 45/121* | (2022.01) | |
| *H04L 47/41* | (2022.01) | |

(52) U.S. Cl.
CPC ....... *H04W 72/0453* (2013.01); *H04W 76/27* (2018.02); *H04W 92/18* (2013.01)

(56) References Cited

U.S. PATENT DOCUMENTS

| | | | | |
|---|---|---|---|---|
| 2016/0135143 | A1* | 5/2016 | Won | H04W 12/08 370/312 |
| 2016/0302249 | A1* | 10/2016 | Sheng | H04W 4/70 |
| 2016/0302250 | A1* | 10/2016 | Sheng | H04W 76/14 |
| 2016/0338095 | A1* | 11/2016 | Faurie | H04W 28/0278 |
| 2017/0064660 | A1* | 3/2017 | Chen | H04W 56/0025 |
| 2017/0339511 | A1* | 11/2017 | Lee | H04L 5/0091 |
| 2018/0192462 | A1* | 7/2018 | Hu | H04W 76/23 |
| 2018/0324660 | A1* | 11/2018 | Jung | H04W 76/27 |
| 2018/0368090 | A1* | 12/2018 | Kadambar | H04W 72/1278 |
| 2019/0124015 | A1* | 4/2019 | Loehr | H04L 69/321 |
| 2019/0174530 | A1* | 6/2019 | Kim | H04W 72/12 |
| 2019/0239186 | A1* | 8/2019 | Tugnawat | H04L 67/12 |
| 2019/0306912 | A1* | 10/2019 | Cheng | H04W 76/11 |
| 2019/0394786 | A1* | 12/2019 | Parron | H04L 27/0006 |
| 2020/0037132 | A1* | 1/2020 | Wu | H04W 8/005 |
| 2020/0059821 | A1* | 2/2020 | Wirth | H04W 28/0268 |
| 2020/0196279 | A1* | 6/2020 | Thomas | H04W 72/0406 |
| 2020/0337096 | A1* | 10/2020 | Zhang | H04L 1/0061 |
| 2020/0359408 | A1* | 11/2020 | Faurie | H04W 88/04 |
| 2021/0037359 | A1* | 2/2021 | Lee | H04W 72/1284 |
| 2021/0068079 | A1* | 3/2021 | Sahin | H04W 72/048 |
| 2021/0160014 | A1* | 5/2021 | Selvanesan | H04W 76/27 |
| 2021/0160817 | A1* | 5/2021 | Khoryaev | H04W 76/14 |
| 2021/0212025 | A1* | 7/2021 | Selvanesan | H04W 76/14 |
| 2021/0314750 | A1* | 10/2021 | Nguyen | H04W 4/46 |

OTHER PUBLICATIONS

CATT, Discussion on mode 3 and mode 4 shared resource pool, 3GPP TSG-RAN WG2 #99bis, R2-1710715, Oct. 13, 2017.
Samsung, Mode 3/Mode 4 resource pool sharing on V2X phase 2, 3GPP TSG RAN WG2 Meeting #99bis, R2-1711754, Oct. 13, 2017.

* cited by examiner

ON-DEMAND NETWORK CONFIGURATION OF V2X UE AUTONOMY IN NEW RADIO MOBILE COMMUNICATIONS

CROSS REFERENCE TO RELATED PATENT APPLICATION(S)

The present disclosure is part of a non-provisional application claiming the priority benefit of U.S. Patent Application No. 62/738,199, filed on 28 Sep. 2018, the content of which being incorporated by reference in its entirety.

TECHNICAL FIELD

The present disclosure is generally related to wireless communications and, more particularly, to techniques pertaining to on-demand network configuration of vehicle-to-everything (V2X) user equipment (UE) autonomy in New Radio (NR) mobile communications.

BACKGROUND

Unless otherwise indicated herein, approaches described in this section are not prior art to the claims listed below and are not admitted as prior art by inclusion in this section.

Under the $3^{rd}$ Generation Partnership Project (3GPP) specifications, Long-Term Evolution (LTE) V2X supports two resource allocations, namely: network-controlled resource allocation (Mode-3) and UE autonomous resource allocation (Mode-4). When a V2X UE is in cellular coverage of an LTE base station, information for sidelink resource allocation is provided by the base station (i.e., the resource allocation mode being Mode-3). When the V2X UE is out of coverage of the LTE base station, in terms of the same frequency as the frequency used on the sidelink, resource allocation decision is determined by the UE itself autonomously (i.e., the resource allocation mode being Mode-4). Thus, in LTE, whether a UE operates in Mode-3 or Mode-4 depends on the condition of UE coverage by the LTE base station. In NR mobile communications, however, NR V2X supports more advanced scenarios and use cases compared to LTE V2X. Thus, for NR V2X, a more flexible design is necessary for the selection of mode for resource allocation.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure aims to propose concepts, solutions, schemes, techniques, designs, methods and apparatus pertaining to on-demand network configuration of V2X UE autonomy in NR mobile communications.

In one aspect, a method may involve a processor of an apparatus, implemented in a first UE, receiving a signaling from a network node of a wireless network. The method may also involve the processor operating, based on the signaling, simultaneously in a network-controlled mode and an autonomous mode such that: (a) the first UE operates in the network-controlled mode with respect to resource allocation on a first sidelink with a second UE, and (b) the first UE operates in the autonomous mode with respect to resource allocation on a second sidelink with the second UE or a third UE.

In one aspect, a method may involve a processor of an apparatus, implemented in a first UE, receiving a signaling from a network node of a wireless network. The method may also involve the processor performing, based on the signaling, either: (a) operating in a network-controlled mode on one or more out-of-coverage frequencies with respect to resource allocation for communications on a sidelink between the first UE and a second UE; or (b) operating in an autonomous mode on one or more in-coverage frequencies with respect to the resource allocation for the communications on the sidelink between the first UE and the second UE.

It is noteworthy that, although description provided herein may be in the context of certain radio access technologies, networks and network topologies such as NR V2X, the proposed concepts, schemes and any variation(s)/derivative(s) thereof may be implemented in, for and by other types of radio access technologies, networks and network topologies such as, for example and without limitation, 5th Generation (5G), Long-Term Evolution (LTE), LTE-Advanced, LTE-Advanced Pro and any future-developed networks and technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art.

In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to on-demand network configuration of V2X UE autonomy in NR mobile communications. According to the present disclosure, a number of possible solutions may be implemented separately or jointly. That is, although these possible solutions may be described below separately, two or more of these possible solutions may be implemented in one combination or another.

Figure 1:
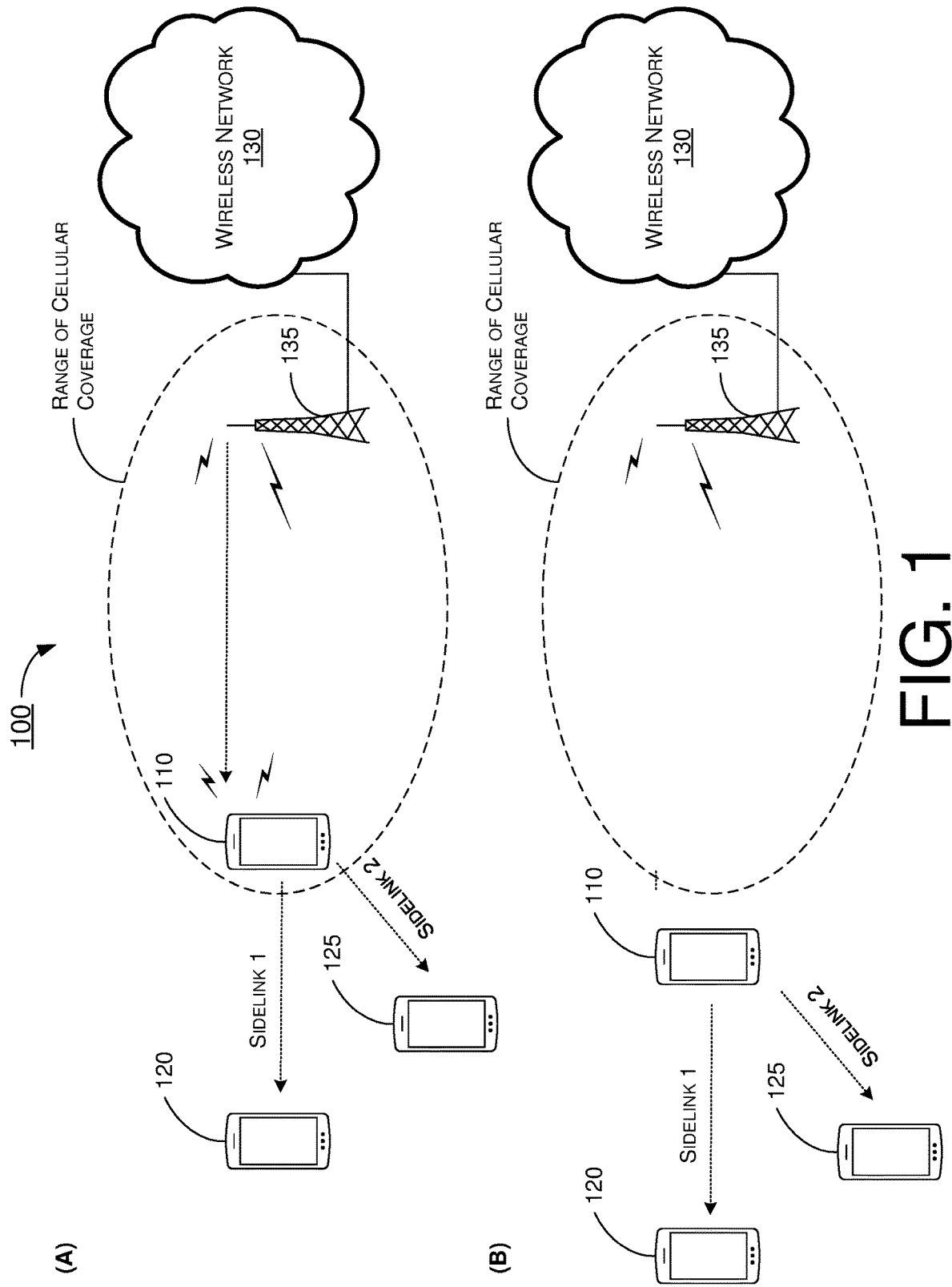
FIG. 1 is a diagram of an example network environment in which various solutions and schemes in accordance with the present disclosure may be implemented.
Figure 2:
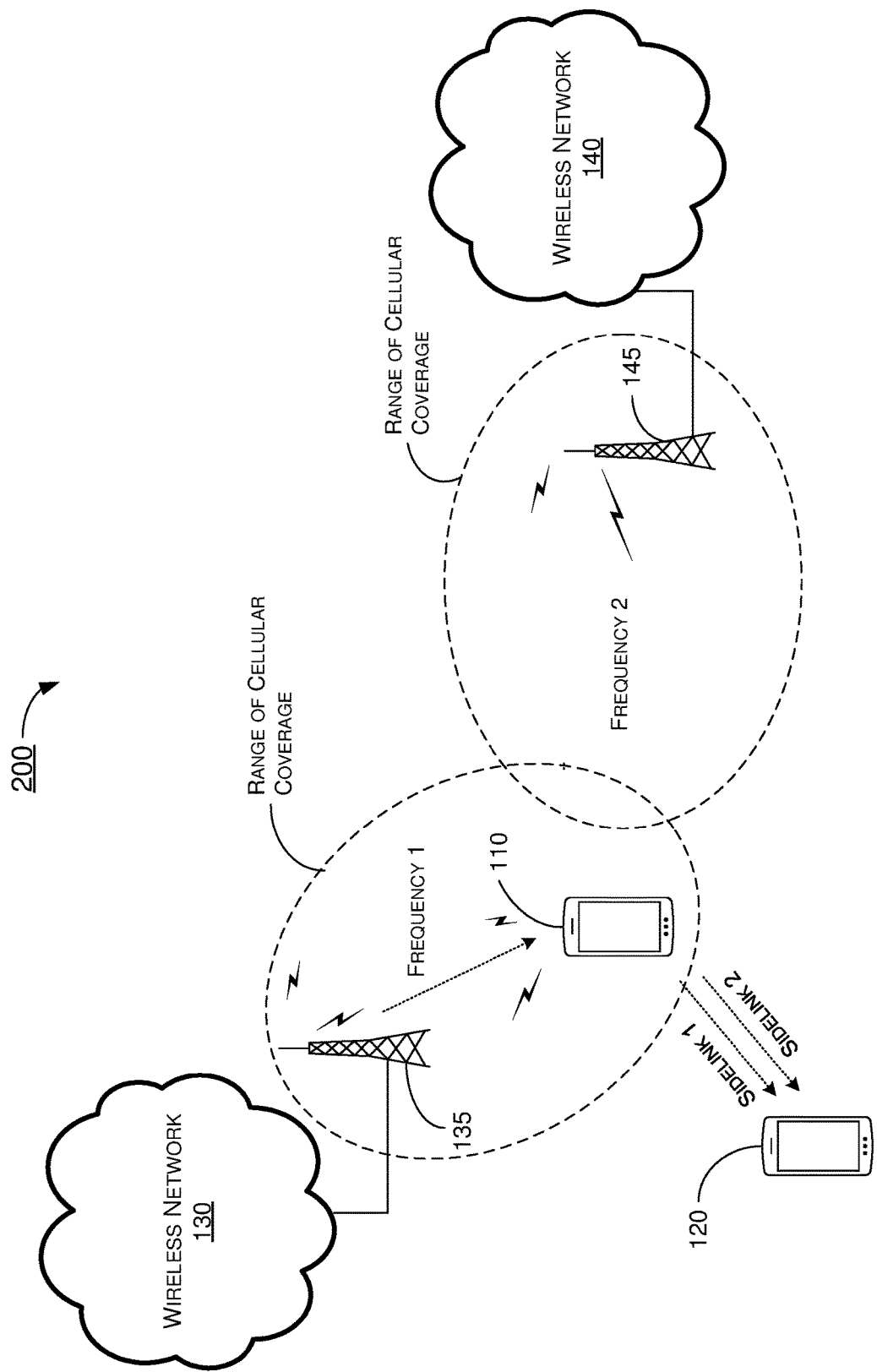
FIG. 2 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2 illustrates an example network environment 200 in which various solutions and schemes in accordance with the present disclosure may be implemented. Referring to FIG. 1, network environment 100 may be an NR V2X communication environment involving a first UE 110, a second UE 120, a third UE 125, and a wireless network 130. Wireless network 130 may be in wireless communication with first UE 110 via a base station 135 (e.g., an eNB, gNB or transmit/receive point (TRP)). First UE 110 may be in wireless communication with second UE 120 via a first NR sidelink (denoted as "sidelink 1" in FIG. 1), and first UE 110 may also be in wireless communication with third UE 125 via a second NR sidelink (denoted as "sidelink 2" in FIG. 1). Each of first UE 110, second UE 120 and third UE 125 may be in or as a part of, for example and without limitation, a portable apparatus (e.g., smartphone), a vehicle or a component thereof, a roadside unit (RSU) (e.g., a traffic signal, a street lamp, a roadside sensor or a roadside structure) or an Internet of Thing (IoT) device (e.g., a sensor). In network environment 100, first UE 110, second UE 120 and wireless network 130 (via base station 135) may implement various schemes pertaining to on-demand network configuration of V2X UE autonomy in NR mobile communications in accordance with the present disclosure, as described below. It is noteworthy that, although FIG. 1 shows first UE 110 simultaneously in communication with second UE 120 and third UE 125 via NR sidelinks, in various scenarios first UE 110 may be simultaneously in communication with a different number (e.g., more than two) UEs via NR sidelinks while implementing one or more proposed schemes in accordance with the present disclosure.

Specifically, Part (A) of FIG. 1 illustrates first UE 110, second UE 120 and third UE 125 operating in Mode-1 of NR sidelink resource allocation (of network-controlled resource allocation) as first UE 110 is in coverage of base station 135 and there is data to be transmitted from first UE 110 to either or both of second UE 120 and third UE 125 via first NR sidelink and/or second NR sidelink, respectively. Thus, allocation of resources on the first sidelink between first UE 110 and second UE 120 and allocation of resources on the second sidelink between first UE 110 and third UE 125 may be controlled by base station 135. Moreover, Part (B) of FIG. 1 illustrates first UE 110, second UE 120 and third UE 125 operating in Mode-2 of NR sidelink resource allocation (or UE-autonomous resource allocation) as first UE 110 is out of coverage of base station 135 and there is data to be transmitted from first UE 110 to either or both of second UE 120 and third UE 125 via first NR sidelink and/or second NR sidelink, respectively. Thus, allocation of resources on the first sidelink between first UE 110 and second UE 120 and allocation of resources on the second sidelink between first UE 110 and third UE 125 may be preconfigured by base station 130 and then autonomously controlled by first UE 110.

It is noteworthy that, while first UE 110 is out of coverage of base station 135 on one frequency, first UE 110 may at the same time be in coverage with another base station of another network on a different frequency, and vice versa. That is, so long as first UE 110 is in coverage of a given base station, whether base station 135 or another base station (not shown), that base station may control the resource allocation for the first sidelink between first UE 110 and second UE 120 or the resource allocation for the second sidelink between first UE 110 and third UE 130 under Mode-1 of NR sidelink resource allocation. Accordingly, first UE 110 may simultaneously operate in Mode-1 and Mode-2 in that first UE 110 may operate in Mode-1 on a first frequency with one of second UE 120 and third UE 125 and simultaneously operate in Mode-2 on a second frequency (different from first frequency) with the other of second UE 120 and third UE 125. For instance, in part (B) of FIG. 1, with both first UE 110 and second UE 120 being out of the cellular coverage of base station 135, first UE 110 may operate in Mode-2 of NR sidelink resource allocation with respect to the first sidelink with second UE 120. Meanwhile, as both first UE 110 and third UE 125 may be in the cellular coverage of another base station (not shown), first UE 110 may operate in Mode-1 of NR sidelink resource allocation with respect to the second sidelink with third UE 125.

Referring to FIG. 2, network environment 200 may be an NR V2X communication environment involving a first UE 110, a second UE 120, a wireless network 130, and another wireless network 140. Wireless network 130 may be in wireless communication with first UE 110 via a base station 135 (e.g., an eNB, gNB or TRP). Similarly, wireless network 140 may be in wireless communication with first UE 110 via a base station 145 (e.g., an eNB, gNB or TRP). First UE 110 may be in wireless communication with second UE 120 via a first NR sidelink (denoted as "sidelink 1" in FIG. 2), and first UE 110 may also be in wireless communication with second UE 120 via a second NR sidelink (denoted as "sidelink 2" in FIG. 2). Each of first UE 110 and second UE 120 may be in or as a part of, for example and without limitation, a portable apparatus (e.g., smartphone), a vehicle or a component thereof, a roadside unit (RSU) (e.g., a traffic signal, a street lamp, a roadside sensor or a roadside structure) or an IoT device (e.g., a sensor). In network environment 200, first UE 110, second UE 120, wireless network 130 (via base station 135), and wireless network 140 (via base station 145) may implement various schemes pertaining to on-demand network configuration of V2X UE autonomy in NR mobile communications in accordance with the present disclosure, as described below. It is noteworthy that, although two networks (wireless network 130 and wireless network 140) are shown in FIG. 2, description herein with respect to FIG. 2 and scenario 200 may apply to cases in which both base station 135 and base station 145 are part of the same network (e.g., wireless network 130 or wireless network 140).

In the example shown in FIG. 2, first UE 110 may be in cellular coverage of base station 135 on a first frequency while out of cellular coverage of base station 145 on a second frequency different from the first frequency. Thus, first UE 110 may simultaneously operate in Mode-1 and Mode-2 in that first UE 110 may operate in Mode-1 on the first frequency with respect to resource allocation on a first sidelink (denoted as "sidelink 1" in FIG. 2) with second UE 120 and simultaneously operate in Mode-2 on the second frequency with respect to resource allocation on a second sidelink (denoted as "sidelink 2" in FIG. 2) with the second UE 120.

Unlike LTE V2X, in NR V2X one-to-one correlation between coverage conditions and resource allocation modes may not be as straight forward as in LTE V2X. Two scenarios, in which various proposed schemes in accordance with the present disclosure may be implemented, are described below.

In a first scenario, an out-of-coverage NR-capable UE (e.g., first UE 110) may, on a given sidelink frequency, be in cellular coverage of an NR base station (e.g., base station 135) on a different frequency. With the assistance of cross-carrier scheduling (if supported), base station 135 may allocate sidelink resources in Mode-1 for first UE 110 which is out of coverage. Such flexibility may improve interference management and spectral gain by way of better collision avoidance.

In a second scenario, an in-coverage NR-capable UE (e.g., first UE 110) may also benefit from Mode-2 resource allocation. For example, when UEs communicate in NR V2X and exchange all control information autonomously on a sidelink instead of using the Uu interface, lower end-to-end (e2e) latency (and possibly also lower physical layer (PHY) latency) may be achieved. As NR V2X supports advanced use cases with latency-critical service requirements, it may be preferable to enable NR-capable UEs to communicate autonomously through sidelink even when such UEs are in coverage of an NR base station. As another example, LTE-Uu interface (with necessary enhancements) may help configure NR sidelink although it is unclear whether all advanced use cases in NR V2X may be supported via LTE-Uu, due to lack of NR-specific concepts such as, for example, bandwidth part (BWP) and numerology. Thus, it may be desirable to allow NR-capable UEs to communicate with each other autonomously through sidelink even when they are in LTE coverage.

In view of the above, under various proposed schemes in accordance with the present disclosure, network signaling may be utilized to enable on-demand network configuration for UE autonomy. Under a proposed scheme, wireless network 130 may, via base station 135, configure in-coverage first UE 110 (e.g., as shown in part (A) of FIG. 1), which is in cellular coverage of base station 135 on a first frequency, to operate in an "autonomous selection" or "autonomous" mode (e.g., Mode-2 in NR V2X) with respect to sidelink resource allocation. The configuration from base station 135 may be applied by first UE 110 in a plethora of aspects. Firstly, the configuration may apply to all transmissions of first UE 110 on the first frequency. Secondly, the configuration may apply to all transmissions of first UE 110 on a selected/indicated resource pool. Thirdly, the configuration may apply to all transmissions performed by first UE 110 according to a given resource allocation technique (e.g., all dynamic grants, all Type-1 grant-free (GF) configurations, all Type-2 semi-persistent scheduling (SPS) configurations, and so on). Additionally, the configuration may apply to a given destination identifier (ID), which may refer to one other UE (e.g., second UE 120 or third UE 125) or a group of other UEs. Moreover, the configuration may apply to a given quality of service (QoS) metric such as a QoS flow ID or a ProSe per packet priority (PPPP) value, which may be associated with a certain service type (e.g., a latency-critical or latency-sensitive service).

Under another proposed scheme, wireless network 130 may, via base station 135, configure out-of-coverage first UE 110 (e.g., as shown in part (B) of FIG. 1), which is out of cellular coverage of base station 135 on a first frequency, to operate in a "network controlled" mode (e.g., Mode-1 in NR V2X) with respect to sidelink resource allocation. One assumption under this proposed scheme is that first UE 110 is in coverage of another cell, which may refer to either (i) a second frequency (different from the first frequency) of the same radio access technology (RAT) or (ii) an inter-RAT cell. The configuration from base station 135 may be applied by first UE 110 in a plethora of aspects. Firstly, the configuration may apply to all transmissions of first UE 110 on the first frequency. Secondly, the configuration may apply to all transmissions of first UE 110 on a selected/indicated resource pool. Thirdly, the configuration may apply to all transmissions performed by first UE 110 according to a given resource allocation technique (e.g., all dynamic grants, all Type-1 GF configurations, all Type-2 SPS configurations, and so on). Additionally, the configuration may apply to a given destination ID, which may refer to one other UE (e.g., second UE 120 or third UE 125) or a group of other UEs. Moreover, the configuration may apply to a given QoS flow ID, which may be associated with a certain service type (e.g., a high-reliability service).

Under a proposed scheme in accordance with the present disclosure, network configuration may be conveyed in one or more manners including, for example and without limitation, radio resource control (RRC) signaling and downlink control information (DCI) signaling. Under the proposed scheme, RRC signaling may be utilized for semi-static configurations, and RRC signaling may be the preferred way of signaling in an event that the configuration applies to all transmissions of first UE 110 or all transmissions of a given Type-1 GF or Type-2 SPS configuration. Under the proposed scheme, DCI signaling may allow more dynamic configuration for first UE 110 to quickly switch between network-controlled (Mode-1) and autonomous selection (Mode-2) modes of sidelink resource allocation. Under the proposed scheme, DCI signaling may be the preferred option in an event that the configuration applies to a given dynamic grant or for a given destination ID.

In LTE V2X, the term "UE autonomy" refers to only the selection of the transmission resources within a configured pool whereas any other link parameters and the configuration of resource pools are still controlled by the network. In NR V2X, this may be designed differently. Under a proposed scheme in accordance with the present disclosure, with respect to the level or granularity of UE autonomy versus network control, first UE 110 may switch between Mode-1 and Mode-2, and the level or granularity of UE autonomy may be configured based on multiple options. In a first option, when first UE 110 is in the autonomous mode, first UE 110 may determine transmission resources while link parameters and resource pools may still be controlled by wireless network 130 (e.g., via base station 135). This may serve as a baseline option similar to LTE V2X. In a second option, when first UE 110 is in the autonomous mode, first UE 110 may determine transmission resources and link parameters while resource pools may still be controlled by wireless network 130 (e.g., via base station 135). In a third option, when first UE 110 is in the autonomous mode, first UE 110 may determine link parameters while resource transmissions and resource pools may still be controlled by wireless network 130 (e.g., via base station 135). In a fourth option, when first UE 110 is in the autonomous mode, first UE 110 may determine link parameters, transmission resources, and resource pools. The determination of resource pools may simply involve the selection of one pool from a set of resource pools preconfigured by wireless network 130.

Thus, under various proposed schemes in accordance with the present disclosure, a UE (e.g., first UE 110) may be configured to operate in both network-controlled resource allocation mode (e.g., Mode-1) and autonomous resource allocation mode (e.g., Mode-2) simultaneously with a respective configuration for each of the two modes applicable to all transmissions in different aspects. Some illustrative and non-limiting examples are described below.

For instance, first UE 110 may operate in both the network-controlled mode and the autonomous mode simultaneously by applying different configurations to all transmissions on different frequencies such that a first configuration for Mode-1 operation may be applied by first UE 110 to all transmissions on a first frequency and a second configuration for Mode-2 operation may be applied by first UE 110 to all transmissions on a second frequency different from the first frequency.

Also, first UE 110 may operate in both the network-controlled mode and the autonomous mode simultaneously by applying different configurations to all transmissions on different resource pools such that a first configuration for Mode-1 operation may be applied by first UE 110 to all transmissions using a first resource pool and a second configuration for Mode-2 operation may be applied by first UE 110 to all transmissions using a second resource pool different from the first resource pool.

Moreover, first UE 110 may operate in both the network-controlled mode and the autonomous mode simultaneously by applying different configurations to all transmissions using different resource assignment techniques such that a first configuration for Mode-1 operation may be applied by first UE 110 to all transmissions using a first resource assignment technique and a second configuration for Mode-2 operation may be applied by first UE 110 to all transmissions using a second resource assignment technique different from the first resource assignment technique. The different resource assignment techniques may include, for example and without limitation, dynamic grants, RRC-activated GF configurations, and DCI-activated GF configurations.

Furthermore, first UE 110 may operate in both the network-controlled mode and the autonomous mode simultaneously by applying different configurations to all transmissions according to different cast types such that a first configuration for Mode-1 operation may be applied by first UE 110 to all transmissions according to a first cast type and a second configuration for Mode-2 operation may be applied by first UE 110 to all transmissions according to a second cast type different from the first cast type. The different cast types may include, for example and without limitation, unicast, groupcast and broadcast.

Additionally, first UE 110 may operate in both the network-controlled mode and the autonomous mode simultaneously by applying different configurations to all transmissions to different destination IDs or group IDs such that a first configuration for Mode-1 operation may be applied by first UE 110 to all transmissions to a first destination ID (or a first group ID) and a second configuration for Mode-2 operation may be applied by first UE 110 to all transmissions to a second destination ID (or a second group ID) different from the first destination ID (or the first group ID).

Similarly, first UE 110 may operate in both the network-controlled mode and the autonomous mode simultaneously by applying different configurations to all transmissions that are associated with different QoS flow IDs such that a first configuration for Mode-1 operation may be applied by first UE 110 to all transmissions that are associated with a first QoS metric such as a first QoS flow ID and/or a first PPPP value and a second configuration for Mode-2 operation may be applied by first UE 110 to all transmissions that are associated with a first QoS metric such as a QoS flow ID and/or a PPPP value different from the first QoS metric.

Under various proposed schemes in accordance with the present disclosure, a UE (e.g., first UE 110) may be configured by network (e.g., wireless network 130 via base station 135) via an RRC signaling or a DCI signaling to operate in the network-controlled mode on one or more out-of-coverage frequencies. Under a proposed scheme, RRC signaling may be utilized by wireless network 130 to configure one or more frequencies, resource pools, resource assignment techniques, a set of destination IDs (and/or group IDs), and/or a set of QoS flow metrics such as QoS flow IDs or PPPP values. Under the proposed scheme, DCI signaling may be utilized by wireless network 130 to enable dynamic configuration for first UE 110 to quickly switch between the network-controlled mode and the autonomous mode.

Under various proposed schemes in accordance with the present disclosure, a UE (e.g., first UE 110) may be configured by network (e.g., wireless network 130 via base station 135) via an RRC signaling or a DCI signaling to operate in the autonomous mode on one or more in-coverage frequencies. Under a proposed scheme, RRC signaling may be utilized by wireless network 130 to configure one or more frequencies, resource pools, resource assignment techniques, a set of destination IDs (and/or group IDs), and/or a set of QoS flow IDs. Under the proposed scheme, DCI signaling may be utilized by wireless network 130 to enable dynamic configuration for first UE 110 to quickly switch between the network-controlled mode and the autonomous mode.

Illustrative Implementations

Figure 3:
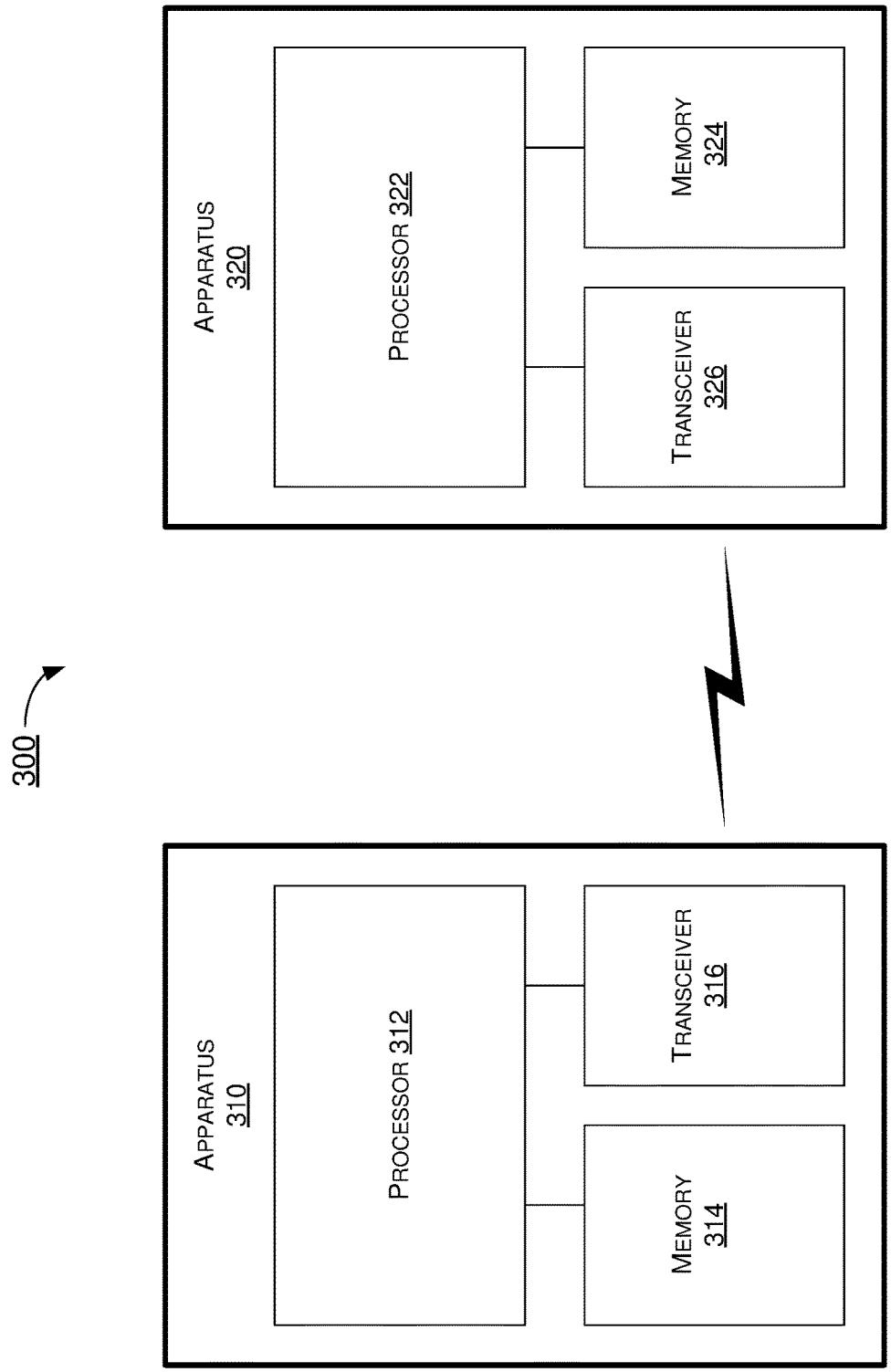
FIG. 3 is a block diagram of an example communication system in accordance with an implementation of the present disclosure.

FIG. 3 illustrates an example communication system 300 having an example apparatus 310 and an example apparatus 320 in accordance with an implementation of the present disclosure. Each of apparatus 310 and apparatus 320 may perform various functions to implement schemes, techniques, processes and methods described herein pertaining to on-demand network configuration of V2X UE autonomy in NR mobile communications, including various schemes described above as well as processes described below.

Each of apparatus 310 and apparatus 320 may be a part of an electronic apparatus, which may be a UE such as a vehicle, a portable or mobile apparatus, a wearable apparatus, a wireless communication apparatus or a computing apparatus. For instance, each of apparatus 310 and apparatus 320 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 310 and apparatus 320 may also be a part of a machine type apparatus, which may be an IoT or NB-IoT apparatus such as an immobile or a stationary apparatus, a home apparatus, a wire communication apparatus or a computing apparatus. For instance, each of apparatus 310 and apparatus 320 may be implemented in a smart thermostat, a smart fridge, a smart door lock, a wireless speaker or a home control center. Alternatively, each of apparatus 310 and apparatus 320 may be implemented in the form of one or more integrated-circuit (IC) chips such as, for example and without limitation, one or more single-core processors, one or more multi-core processors, or one or more complex-instruction-set-computing (CISC) processors. Each of apparatus 310 and apparatus 320 may include at least some of those components shown in FIG. 3 such as a processor 312 and a processor 322, respectively. Each of apparatus 310 and apparatus 320 may further include one or more other components not pertinent to the proposed scheme of the present disclosure (e.g., internal power supply, display device and/or user interface device), and, thus, such component(s) of each of apparatus 310 and apparatus 320 are neither shown in FIG. 3 nor described below in the interest of simplicity and brevity.

In some implementations, at least one of apparatus 310 and apparatus 320 may be a part of an electronic apparatus, which may be a vehicle, a roadside unit (RSU), network node or base station (e.g., eNB, gNB or TRP), a small cell, a router or a gateway. For instance, at least one of apparatus 310 and apparatus 320 may be implemented in a vehicle in a vehicle-to-vehicle (V2V) or V2X network, an eNodeB in an LTE, LTE-Advanced or LTE-Advanced Pro network or in a gNB in a 5G, NR, IoT or NB-IoT network. Alternatively, at least one of apparatus 310 and apparatus 320 may be implemented in the form of one or more IC chips such as, for example and without limitation, one or more single-core processors, one or more multi-core processors, or one or more CISC processors.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including on-demand network configuration of V2X UE autonomy in NR mobile communications in accordance with various implementations of the present disclosure.

In some implementations, apparatus 310 may also include a transceiver 316, as a communication device, coupled to processor 312 and capable of wirelessly transmitting and receiving data. In some implementations, apparatus 310 may further include a memory 314 coupled to processor 312 and capable of being accessed by processor 312 and storing data therein. In some implementations, apparatus 320 may also include a transceiver 326, as a communication device, coupled to processor 322 and capable of wirelessly transmitting and receiving data. In some implementations, apparatus 320 may further include a memory 324 coupled to processor 322 and capable of being accessed by processor 322 and storing data therein. Accordingly, apparatus 310 and apparatus 320 may wirelessly communicate with each other via transceiver 316 and transceiver 326, respectively.

To aid better understanding, the following description of the operations, functionalities and capabilities of each of apparatus 310 and apparatus 320 is provided in the context of an NR V2X communication environment in which apparatus 310 is implemented in or as a wireless communication device, a communication apparatus or a UE (e.g., first UE 110) and apparatus 320 is implemented in or as a network node (e.g., base station 135 of wireless network 130).

In one aspect of on-demand network configuration of V2X UE autonomy in NR mobile communications in accordance with the present disclosure, processor 312 of apparatus 310, implemented in a first UE (e.g., first UE 110) may receive, via transceiver 316, a signaling from apparatus 320 as a network node of a wireless network. Additionally, processor 312 may operate, based on the signaling, simultaneously in a network-controlled mode and an autonomous mode. For instance, apparatus 310 may operate in the network-controlled mode with respect to resource allocation on a first sidelink with a second UE (e.g., second UE 120) and simultaneously operate in the autonomous mode with respect to resource allocation on a second sidelink with the second UE (e.g., as in network environment 200) or a third UE (e.g., third UE 125, as in network environment 100).

In some implementations, in operating simultaneously in the network-controlled mode and the autonomous mode, processor 312 may operate simultaneously in the network-controlled mode and the autonomous mode by applying a first configuration for the network-controlled mode to transmissions to the second UE on a first frequency while applying a second configuration for the autonomous mode to transmissions to the second UE or the third UE on a second frequency different from the first frequency.

In some implementations, in operating simultaneously in the network-controlled mode and the autonomous mode, processor 312 may operate simultaneously in the network-controlled mode and the autonomous mode by applying a first configuration for the network-controlled mode to transmissions to the second UE using a first resource pool while applying a second configuration for the autonomous mode to transmissions to the second UE or the third UE using a second resource pool different from the first resource pool.

In some implementations, in operating simultaneously in the network-controlled mode and the autonomous mode, processor 312 may operate simultaneously in the network-controlled mode and the autonomous mode by applying a first configuration for the network-controlled mode to transmissions to the second UE using a first resource assignment technique while applying a second configuration for the autonomous mode to transmissions to the second UE or the third UE using a second resource assignment technique different from the first resource assignment technique. In such cases, the first resource assignment technique may include one of dynamic grants, RRC-activated GF configurations, and DCI-activated GF configurations, and the second resource assignment technique may include another of the dynamic grants, RRC-activated GF configurations, and DCI-activated GF configurations.

In some implementations, in operating simultaneously in the network-controlled mode and the autonomous mode, processor 312 may operate simultaneously in the network-controlled mode and the autonomous mode by applying a first configuration for the network-controlled mode to transmissions to the second UE according to a first cast type while applying a second configuration for the autonomous mode to transmissions to the second UE or the third UE according to a second cast type different from the first cast type. In such cases, the first cast type may include one of unicast, groupcast and broadcast, and the second cast type may include another of the unicast, groupcast and broadcast.

In some implementations, in operating simultaneously in the network-controlled mode and the autonomous mode, processor 312 may operate simultaneously in the network-controlled mode and the autonomous mode by applying a first configuration for the network-controlled mode to transmissions to a first destination ID or a first group ID while applying a second configuration for the autonomous mode to transmissions to a second destination ID or a second group ID different from the first destination ID or the first group ID.

In some implementations, in operating simultaneously in the network-controlled mode and the autonomous mode, processor 312 may operate simultaneously in the network-controlled mode and the autonomous mode by applying a first configuration for the network-controlled mode to transmissions associated with a first QoS metric (e.g., a first QoS flow ID and/or a first PPPP value) while applying a second configuration for the autonomous mode to transmissions associated with a second QoS metric (e.g., a second QoS flow ID and/or a second PPPP value) different from the first QoS metric.

In some implementations, in operating simultaneously in the network-controlled mode and the autonomous mode, processor 312 may operate simultaneously in the network-controlled mode and the autonomous mode by performing some or all of: (a) applying a first configuration for the network-controlled mode to transmissions to the second UE on a first frequency while applying a second configuration for the autonomous mode to transmissions to the second UE or the third UE on a second frequency different from the first frequency; (b) applying a first configuration for the network-controlled mode to transmissions to the second UE using a first resource pool while applying a second configuration for the autonomous mode to transmissions to the second UE or the third UE using a second resource pool different from the first resource pool; (c) applying a first configuration for the network-controlled mode to transmissions to the second UE using a first resource assignment technique while applying a second configuration for the autonomous mode to transmissions to the second UE or the third UE using a second resource assignment technique different from the first resource assignment technique; (d) applying a first configuration for the network-controlled mode to transmissions to the second UE according to a first cast type while applying a second configuration for the autonomous mode to transmissions to the second UE or the third UE according to a second cast type different from the first cast type; (e) applying a first configuration for the network-controlled mode to transmissions to a first destination ID or a first group ID while applying a second configuration for the autonomous mode to transmissions to a second destination ID or a second group ID different from the first destination ID or the first group ID; and (f) applying a first configuration for the network-controlled mode to transmissions associated with a first QoS metric (e.g., a first QoS flow ID and/or a first PPPP value) while applying a second configuration for the autonomous mode to transmissions associated with a second QoS metric (e.g., a second QoS flow ID and/or a second PPPP value) different from the first QoS metric.

In some implementations, in operating simultaneously in the network-controlled mode and the autonomous mode, processor 312 may operate in the network-controlled mode on one or more out-of-coverage frequencies. In some implementations, the signaling may include an RRC signaling, and the RRC signaling may configure one or more frequencies, one or more resource pools, one or more resource assignment techniques, a set of destination IDs or group IDs, a set of QoS metrics (e.g., QoS flow IDs and/or PPPP values), or a combination thereof, regarding resource allocation for the sidelink. Alternatively, the signaling may include a DCI signaling, and the DCI signaling may enable dynamic configuration of apparatus 310 to switch between the network-controlled mode and the autonomous mode.

In some implementations, in operating simultaneously in the network-controlled mode and the autonomous mode, processor 312 may operate in the autonomous mode on one or more in-coverage frequencies. In some implementations, the signaling may include an RRC signaling, and the RRC signaling may configure one or more frequencies, one or more resource pools, one or more resource assignment techniques, a set of destination IDs or group IDs, a set of QoS metrics (e.g., QoS flow IDs and/or PPPP values), or a combination thereof, regarding resource allocation for the sidelink. Alternatively, the signaling may include a DCI signaling, and the DCI signaling may enable dynamic configuration of apparatus 310 to switch between the network-controlled mode and the autonomous mode.

In one aspect of on-demand network configuration of V2X UE autonomy in NR mobile communications in accordance with the present disclosure, processor 312 of apparatus 310, implemented in a first UE (e.g., first UE 110) may receive, via transceiver 316, a signaling from apparatus 320 as a network node of a wireless network. Additionally, based on the signaling, processor 312 may perform either: (a) operating in a network-controlled mode on one or more out-of-coverage frequencies with respect to resource allocation for communications on a sidelink between apparatus 310 and a second UE (e.g., second UE 120); or (b) operating in an autonomous mode on one or more in-coverage frequencies with respect to the resource allocation for the communications on the sidelink between apparatus 310 and the second UE.

In some implementations, the signaling may configure apparatus 310 to operate in the network-controlled mode on the one or more out-of-coverage frequencies. In some implementations, the signaling may include an RRC signaling, and the RRC signaling may configure one or more frequencies, one or more resource pools, one or more resource assignment techniques, a set of destination IDs or group IDs, a set of QoS metrics (e.g., QoS flow IDs and/or PPPP values), or a combination thereof, regarding resource allocation for the sidelink. Alternatively, the signaling may include a DCI signaling, and the DCI signaling may enable dynamic configuration of apparatus 310 to switch between the network-controlled mode and the autonomous mode.

In some implementations, the signaling may configure apparatus 310 to operate in the autonomous mode on the one or more in-coverage frequencies. In some implementations, the signaling may include an RRC signaling, and the RRC signaling may configure one or more frequencies, one or more resource pools, one or more resource assignment techniques, a set of destination IDs or group IDs, a set of QoS metrics (e.g., QoS flow IDs and/or PPPP values), or a combination thereof, regarding resource allocation for the sidelink. Alternatively, the signaling may include a DCI signaling, and the DCI signaling may enable dynamic configuration of apparatus 310 to switch between the network-controlled mode and the autonomous mode.

Illustrative Processes

Figure 4:
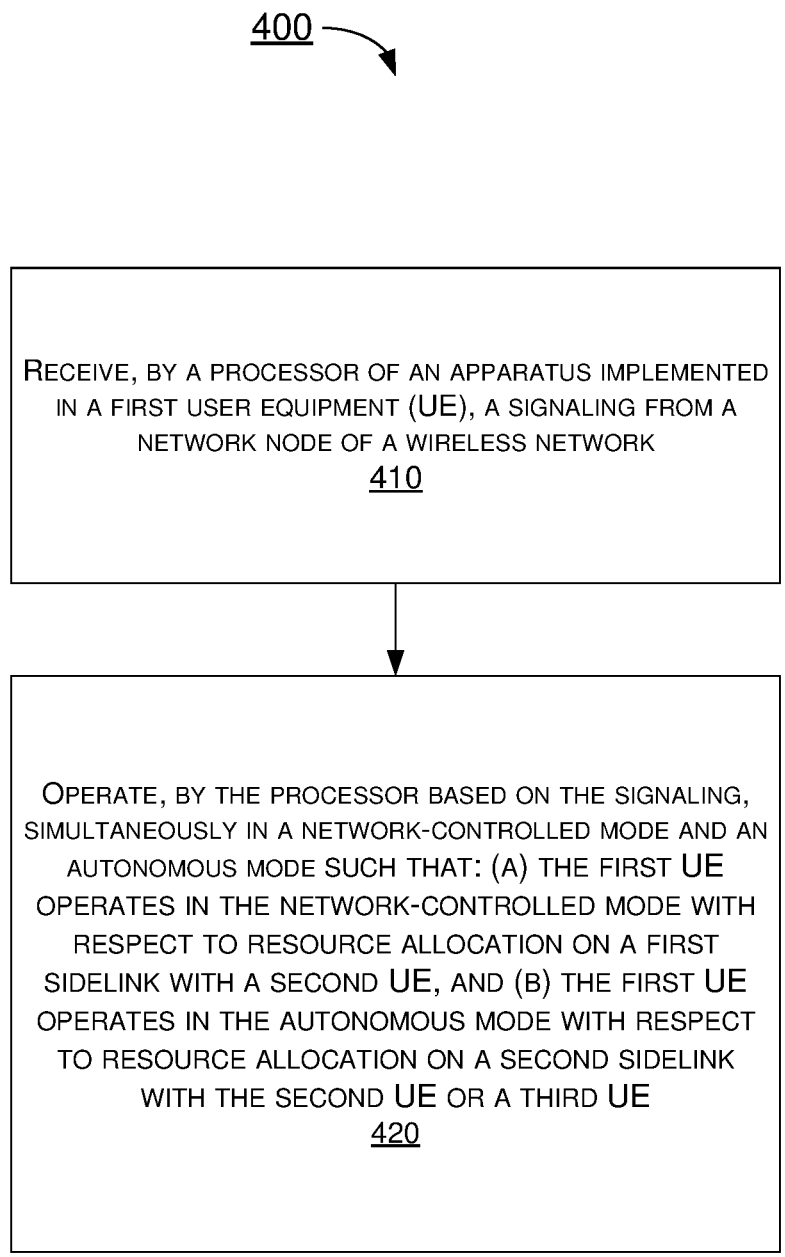
FIG. 4 is a flowchart of an example process in accordance with an implementation of the present disclosure.

FIG. 4 illustrates an example process 400 in accordance with an implementation of the present disclosure. Process 400 may be an example implementation of the proposed schemes described above with respect to on-demand network configuration of V2X UE autonomy in NR mobile communications in accordance with the present disclosure. Process 400 may represent an aspect of implementation of features of apparatus 310 and apparatus 320. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may also be repeated partially or entirely. Process 400 may be implemented by apparatus 310, apparatus 320 and/or any suitable wireless communication device, UE, RSU, base station or machine type devices. Solely for illustrative purposes and without limitation, process 400 is described below in the context of apparatus 310 as a UE (e.g., first UE 110) and apparatus 320 as a network node (e.g., base station 135 of wireless network 130). Process 400 may begin at block 410.

At 410, process 400 may involve processor 312 of apparatus 310, implemented in a first UE (e.g., first UE 110), receiving, via transceiver 316, a signaling from apparatus 320 as a network node of a wireless network. Process 400 may proceed from 410 to 420.

At 420, process 400 may involve processor 312 operating, based on the signaling, simultaneously in a network-controlled mode and an autonomous mode such that apparatus 310 may operate in the network-controlled mode with respect to resource allocation on a first sidelink with a second UE (e.g., second UE 120) and simultaneously operate in the autonomous mode with respect to resource allocation on a second sidelink with the second UE (e.g., as in network environment 200) or a third UE (e.g., third UE 125, as in network environment 100).

In some implementations, in operating simultaneously in the network-controlled mode and the autonomous mode, process 400 may involve processor 312 operating simultaneously in the network-controlled mode and the autonomous mode by applying a first configuration for the network-controlled mode to transmissions to the second UE on a first frequency while applying a second configuration for the autonomous mode to transmissions to the second UE or the third UE on a second frequency different from the first frequency.

In some implementations, in operating simultaneously in the network-controlled mode and the autonomous mode, process 400 may involve processor 312 operating simultaneously in the network-controlled mode and the autonomous mode by applying a first configuration for the network-controlled mode to transmissions to the second UE using a first resource pool while applying a second configuration for the autonomous mode to transmissions to the second UE or the third UE using a second resource pool different from the first resource pool.

In some implementations, in operating simultaneously in the network-controlled mode and the autonomous mode, process 400 may involve processor 312 operating simultaneously in the network-controlled mode and the autonomous mode by applying a first configuration for the network-controlled mode to transmissions to the second UE using a first resource assignment technique while applying a second configuration for the autonomous mode to transmissions to the second UE or the third UE using a second resource assignment technique different from the first resource assignment technique. In such cases, the first resource assignment technique may include one of dynamic grants, RRC-activated GF configurations, and DCI-activated GF configurations, and the second resource assignment technique may include another of the dynamic grants, RRC-activated GF configurations, and DCI-activated GF configurations.

In some implementations, in operating simultaneously in the network-controlled mode and the autonomous mode, process 400 may involve processor 312 operating simultaneously in the network-controlled mode and the autonomous mode by applying a first configuration for the network-controlled mode to transmissions to the second UE according to a first cast type while applying a second configuration for the autonomous mode to transmissions to the second UE or the third UE according to a second cast type different from the first cast type. In such cases, the first cast type may include one of unicast, groupcast and broadcast, and the second cast type may include another of the unicast, groupcast and broadcast.

In some implementations, in operating simultaneously in the network-controlled mode and the autonomous mode, process 400 may involve processor 312 operating simultaneously in the network-controlled mode and the autonomous mode by applying a first configuration for the network-controlled mode to transmissions to a first destination ID or a first group ID while applying a second configuration for the autonomous mode to transmissions to a second destination ID or a second group ID different from the first destination ID or the first group ID.

In some implementations, in operating simultaneously in the network-controlled mode and the autonomous mode, process 400 may involve processor 312 operating simultaneously in the network-controlled mode and the autonomous mode by applying a first configuration for the network-controlled mode to transmissions associated with a first QoS metric (e.g., a first QoS flow ID or a first PPPP value) while applying a second configuration for the autonomous mode to transmissions associated with a second QoS metric (e.g., a second QoS flow ID or a second PPPP value) different from the first QoS metric.

In some implementations, in operating simultaneously in the network-controlled mode and the autonomous mode, process 400 may involve processor 312 operating simultaneously in the network-controlled mode and the autonomous mode by performing some or all of: (a) applying a first configuration for the network-controlled mode to transmissions to the second UE on a first frequency while applying a second configuration for the autonomous mode to transmissions to the third UE on a second frequency different from the first frequency; (b) applying a first configuration for the network-controlled mode to transmissions to the second UE using a first resource pool while applying a second configuration for the autonomous mode to transmissions to the third UE using a second resource pool different from the first resource pool; (c) applying a first configuration for the network-controlled mode to transmissions to the second UE using a first resource assignment technique while applying a second configuration for the autonomous mode to transmissions to the third UE using a second resource assignment technique different from the first resource assignment technique; (d) applying a first configuration for the network-controlled mode to transmissions to the second UE according to a first cast type while applying a second configuration for the autonomous mode to transmissions to the third UE according to a second cast type different from the first cast type; (e) applying a first configuration for the network-controlled mode to transmissions to a first destination ID or a first group ID while applying a second configuration for the autonomous mode to transmissions to a second destination ID or a second group ID different from the first destination ID or the first group ID; and (f) applying a first configuration for the network-controlled mode to transmissions associated with a first QoS flow metric (e.g., a first QoS flow ID or a first PPPP value) while applying a second configuration for the autonomous mode to transmissions associated with a second QoS metric (e.g., a second flow ID or a second PPPP value) different from the first QoS metric.

In some implementations, in operating simultaneously in the network-controlled mode and the autonomous mode, process 400 may involve processor 312 operating in the network-controlled mode on one or more out-of-coverage frequencies. In some implementations, the signaling may include an RRC signaling, and the RRC signaling may configure one or more frequencies, one or more resource pools, one or more resource assignment techniques, a set of destination IDs or group IDs, a set of QoS metrics (e.g., QoS flow IDs and/or PPPP values), or a combination thereof, regarding resource allocation for the sidelink. Alternatively, the signaling may include a DCI signaling, and the DCI signaling may enable dynamic configuration of apparatus 310 to switch between the network-controlled mode and the autonomous mode.

In some implementations, in operating simultaneously in the network-controlled mode and the autonomous mode, process 400 may involve processor 312 operating in the autonomous mode on one or more in-coverage frequencies. In some implementations, the signaling may include an RRC signaling, and the RRC signaling may configure one or more frequencies, one or more resource pools, one or more resource assignment techniques, a set of destination IDs or group IDs, a set of QoS metrics (e.g., QoS flow IDs and/or PPPP values), or a combination thereof, regarding resource allocation for the sidelink. Alternatively, the signaling may include a DCI signaling, and the DCI signaling may enable dynamic configuration of apparatus 310 to switch between the network-controlled mode and the autonomous mode.

Figure 5:
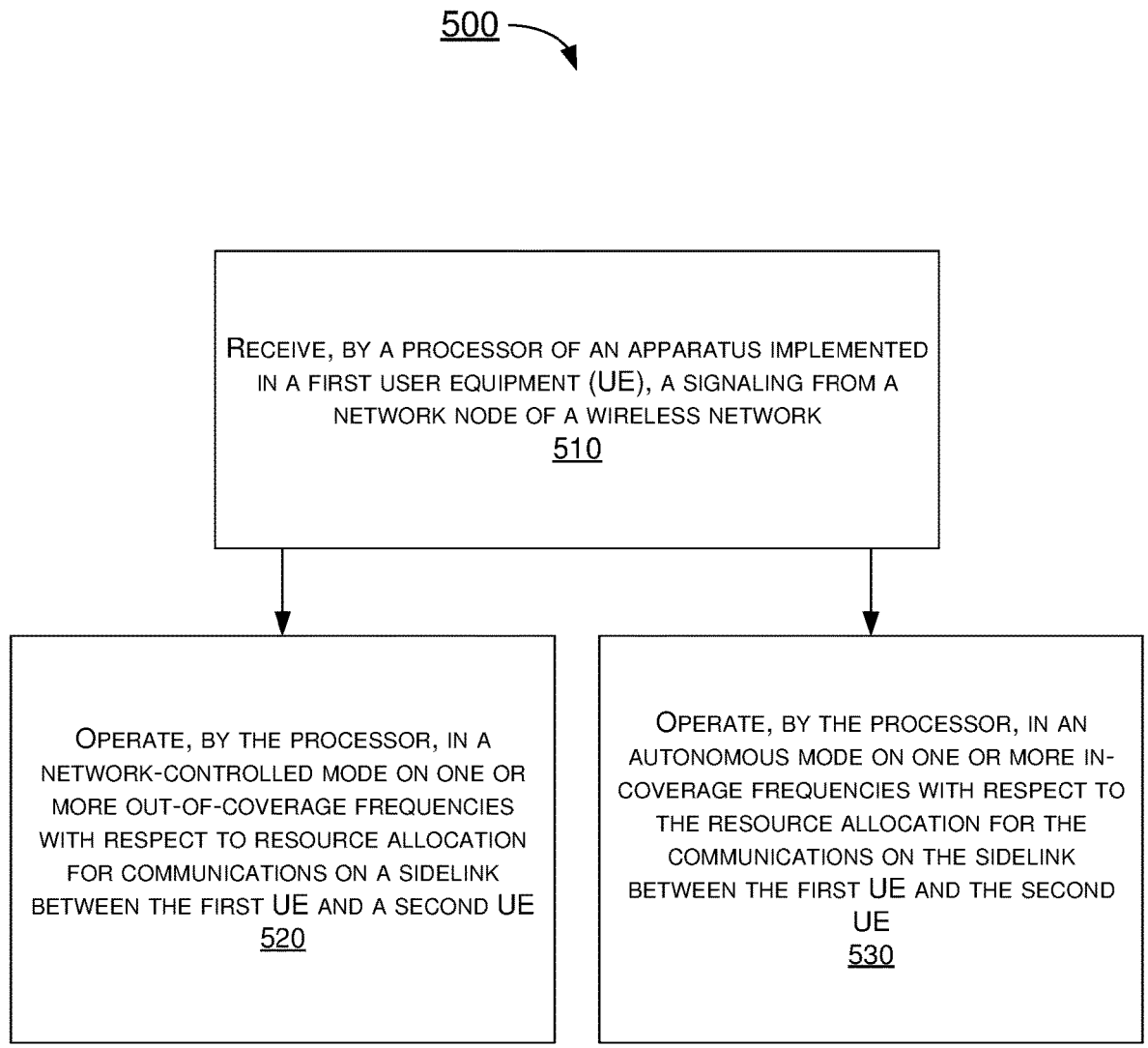
FIG. 5 is a flowchart of an example process in accordance with an implementation of the present disclosure.

FIG. 5 illustrates an example process 500 in accordance with an implementation of the present disclosure. Process 500 may be an example implementation of the proposed schemes described above with respect to on-demand network configuration of V2X UE autonomy in NR mobile communications in accordance with the present disclosure. Process 500 may represent an aspect of implementation of features of apparatus 310 and apparatus 320. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may also be repeated partially or entirely. Process 500 may be implemented by apparatus 310, apparatus 320 and/or any suitable wireless communication device, UE, RSU, base station or machine type devices. Solely for illustrative purposes and without limitation, process 500 is described below in the context of apparatus 310 as a UE (e.g., first UE 110) and apparatus 320 as a network node (e.g., base station 135 of wireless network 130). Process 500 may begin at block 510.

At 510, process 500 may involve processor 312 of apparatus 310, implemented in a first UE (e.g., first UE 110), receiving, via transceiver 316, a signaling from apparatus 320 as a network node of a wireless network. Based on the signaling, process 500 may proceed from 510 to 520 or 530.

At 520, process 500 may involve processor 312 operating in a network-controlled mode on one or more out-of-coverage frequencies with respect to resource allocation for communications on a sidelink between apparatus 310 and a second UE (e.g., second UE 120).

At 530, process 500 may involve processor 312 operating in an autonomous mode on one or more in-coverage frequencies with respect to the resource allocation for the communications on the sidelink between apparatus 310 and the second UE.

In some implementations, the signaling may configure apparatus 310 to operate in the network-controlled mode on the one or more out-of-coverage frequencies. In some implementations, the signaling may include an RRC signaling, and the RRC signaling may configure one or more frequencies, one or more resource pools, one or more resource assignment techniques, a set of destination IDs or group IDs, a set of QoS metrics (e.g., QoS flow IDs and/or PPPP values), or a combination thereof, regarding resource allocation for the sidelink. Alternatively, the signaling may include a DCI signaling, and the DCI signaling may enable dynamic configuration of apparatus 310 to switch between the network-controlled mode and the autonomous mode.

In some implementations, the signaling may configure apparatus 310 to operate in the autonomous mode on the one or more in-coverage frequencies. In some implementations, the signaling may include an RRC signaling, and the RRC signaling may configure one or more frequencies, one or more resource pools, one or more resource assignment techniques, a set of destination IDs or group IDs, a set of QoS metrics (e.g., QoS flow IDs and/or PPPP values), or a combination thereof, regarding resource allocation for the sidelink. Alternatively, the signaling may include a DCI signaling, and the DCI signaling may enable dynamic configuration of apparatus 310 to switch between the network-controlled mode and the autonomous mode.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least,"

the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of vehicle-to-everything (V2X) communication in New Radio (NR), comprising:
   receiving, by a processor of an apparatus implemented in a first user equipment (UE), a signaling from a network node of a wireless network; and
   operating, by the processor based on the signaling, simultaneously in a network-controlled mode and an autonomous mode such that:
      the first UE operates in the network-controlled mode with respect to resource allocation on a first sidelink with a second UE on a first frequency when the first UE is in a cellular coverage of the network node on the first frequency, and
      the first UE operates in the autonomous mode with respect to resource allocation on a second sidelink with the second UE or a third UE on a second frequency different from the first frequency when the first UE is out of another cellular coverage of another network node on the second frequency,
   wherein the operating simultaneously in the network-controlled mode and the autonomous mode comprises operating in the network-controlled mode on one or more in-coverage frequencies when the first UE is in the cellular coverage of the network node on the one or more in-coverage frequencies including the first frequency,
   wherein the signaling comprises a radio resource control (RRC) signaling, and
   wherein the RRC signaling configures the one or more in-coverage frequencies, one or more resource assignment techniques, a set of destination identifiers (IDs) or group IDs, or a combination thereof, regarding resource allocation for the sidelink.

2. The method of claim 1, wherein the operating simultaneously in the network-controlled mode and the autonomous mode comprises operating simultaneously in the network-controlled mode and the autonomous mode by:
   applying a first configuration for the network-controlled mode to transmissions to the second UE on a first frequency; and
   applying a second configuration for the autonomous mode to transmissions to the second UE or the third UE on a second frequency different from the first frequency.

3. The method of claim 1, wherein the operating simultaneously in the network-controlled mode and the autonomous mode comprises operating simultaneously in the network-controlled mode and the autonomous mode by:
   applying a first configuration for the network-controlled mode to transmissions to the second UE using a first resource pool; and
   applying a second configuration for the autonomous mode to transmissions to the second UE or the third UE using a second resource pool different from the first resource pool.

4. The method of claim 1, wherein the operating simultaneously in the network-controlled mode and the autonomous mode comprises operating simultaneously in the network-controlled mode and the autonomous mode by:
   applying a first configuration for the network-controlled mode to transmissions to the second UE using a first resource assignment technique; and
   applying a second configuration for the autonomous mode to transmissions to the second UE or the third UE using a second resource assignment technique different from the first resource assignment technique.

5. The method of claim 4, wherein the first resource assignment technique comprises one of dynamic grants, radio resource control (RRC)-activated grant-free (GF) configurations, and downlink control information (DCI)-activated GF configurations, and wherein the second resource assignment technique comprises another of the dynamic grants, RRC-activated GF configurations, and DCI-activated GF configurations.

6. The method of claim 1, wherein the operating simultaneously in the network-controlled mode and the autonomous mode comprises operating simultaneously in the network-controlled mode and the autonomous mode by:

applying a first configuration for the network-controlled mode to transmissions to the second UE according to a first cast type; and applying a second configuration for the autonomous mode to transmissions to the second UE or the third UE according to a second cast type different from the first cast type.

7. The method of claim 6, wherein the first cast type comprises one of a unicast, groupcast and broadcast, and wherein the second cast type comprises another of the unicast, groupcast and broadcast.

8. The method of claim 1, wherein the operating simultaneously in the network-controlled mode and the autonomous mode comprises operating simultaneously in the network-controlled mode and the autonomous mode by:

applying a first configuration for the network-controlled mode to transmissions to a first destination identifier (ID) or a first group ID; and applying a second configuration for the autonomous mode to transmissions to a second destination ID or a second group ID different from the first destination ID or the first group ID.

9. The method of claim 1, wherein the operating simultaneously in the network-controlled mode and the autonomous mode comprises operating simultaneously in the network-controlled mode and the autonomous mode by:

applying a first configuration for the network-controlled mode to transmissions associated with a first quality of service (QoS) metric comprising a first QoS flow identifier (ID) or a first ProSe per packet priority (PPPP) value; and applying a second configuration for the autonomous mode to transmissions associated with a second QoS metric comprising a second QoS flow ID or a second PPPP value different from the first QoS metric.

10. The method of claim 1, wherein the operating simultaneously in the network-controlled mode and the autonomous mode comprises operating in the autonomous mode on one or more out-of-coverage frequencies when the first UE is out of the cellular coverage of the network node on the first frequency while being in the another cellular coverage of the another network node on the one or more out-of-coverage frequencies including the second frequency.

11. The method of claim 10, wherein the signaling comprises a downlink control information (DCI) signaling, and wherein the DCI signaling enables dynamic configuration of the first UE to switch between the network-controlled mode and the autonomous mode.

12. A method of vehicle-to-everything (V2X) communication in New Radio (NR), comprising:

receiving, by a processor of an apparatus implemented in a first user equipment (UE), a signaling from a network node of a wireless network; and performing, by the processor based on the signaling, either:

operating in a network-controlled mode on one or more out-of-coverage frequencies with respect to resource allocation for communications on a sidelink between the first UE and a second UE when the first UE is out of a cellular coverage of the network node on one or more in-coverage frequencies while being in another cellular coverage of another network node on the one or more out-of-coverage frequencies; or operating in an autonomous mode on the one or more in-coverage frequencies with respect to the resource allocation for the communications on the sidelink between the first UE and the second UE when the first UE is in the cellular coverage of the network node on the one or more in-coverage frequencies, wherein the signaling comprises a radio resource control (RRC) signaling that configures the first UE to operate in the network-controlled mode on the one or more out-of-coverage frequencies and configures the first UE to operate in the autonomous mode on the one or more in-coverage frequencies, and wherein the RRC signaling configures the one or more out-of-coverage frequencies, the one or more in-coverage frequencies, one or more resource assignment techniques, a set of destination identifiers (IDs) or group IDs, or a combination thereof, regarding resource allocation for the sidelink.

13. The method of claim 12, wherein, for operating on the one or more out-of-coverage frequencies, the RRC signaling further configures one or more resource pools regarding resource allocation for the sidelink.

14. The method of claim 12, wherein, for operating on the one or more in-coverage frequencies, the RRC signaling further configures one or more resource pools regarding resource allocation for the sidelink.

* * * * *